United States Patent
Keller et al.

(10) Patent No.: US 9,580,359 B2
(45) Date of Patent: *Feb. 28, 2017

(54) FORMATION OF BORON CARBIDE-BORON NITRIDE CARBON COMPOSITIONS

(71) Applicants: Teddy M. Keller, Fairfax Station, VA (US); Andrew Saab, Washington, DC (US); Matthew Laskoski, Springfield, VA (US)

(72) Inventors: Teddy M. Keller, Fairfax Station, VA (US); Andrew Saab, Washington, DC (US); Matthew Laskoski, Springfield, VA (US)

(73) Assignee: The Government of the United States of America, as represented by the Secretary of the Navy, Arlington, VA (US)

(*) Notice: Subject to any disclaimer, the term of this patent is extended or adjusted under 35 U.S.C. 154(b) by 47 days.

This patent is subject to a terminal disclaimer.

(21) Appl. No.: 14/333,714

(22) Filed: Jul. 17, 2014

(65) Prior Publication Data
US 2014/0329662 A1 Nov. 6, 2014

Related U.S. Application Data

(60) Division of application No. 13/779,771, filed on Feb. 28, 2013, now Pat. No. 8,815,381, which is a (Continued)

(51) Int. Cl.
 *C04B 35/563* (2006.01)
 *C04B 35/64* (2006.01)
(Continued)

(52) U.S. Cl.
 CPC ........... *C04B 35/563* (2013.01); *B82Y 30/00* (2013.01); *C04B 35/522* (2013.01);
(Continued)

(58) Field of Classification Search
 CPC .............................. C04B 35/64; C04B 35/563
 See application file for complete search history.

(56) References Cited

U.S. PATENT DOCUMENTS

| 4,795,673 A | 1/1989 | Frechette et al. |
| 5,635,430 A * | 6/1997 | Divakar ............... C04B 35/565 501/81 |

(Continued)

OTHER PUBLICATIONS

Centeno et al., "Development of titanium-doped carbon-carbon composites" J. Mater. Sci. (2009)44:2525-2532.
(Continued)

*Primary Examiner* — Peter F Godenschwager
(74) *Attorney, Agent, or Firm* — US Naval Research Laboratory; Joseph T. Grunkemeyer

(57) ABSTRACT

A composition having nanoparticles of a boron carbide and a carbonaceous matrix. The composition is not in the form of a powder. A composition comprising boron and an organic component. The organic component is an organic compound having a char yield of at least 60% by weight or a thermoset made from the organic compound. A method of combining boron and an organic compound having a char yield of at least 60% by weight, and heating to form boron carbide or boron nitride nanoparticles.

7 Claims, 9 Drawing Sheets

Related U.S. Application Data continuation-in-part of application No. 13/768,219, filed on Feb. 15, 2013, now Pat. No. 8,865,301, which is a continuation-in-part of application No. 13/749,794, filed on Jan. 25, 2013, now Pat. No. 8,822,023.

(60) Provisional application No. 61/693,930, filed on Aug. 28, 2012, provisional application No. 61/669,201, filed on Jul. 9, 2012, provisional application No. 61/640,744, filed on May 1, 2012, provisional application No. 61/590,852, filed on Jan. 26, 2012.

(51) Int. Cl.

| | | |
|---|---|---|
| *C04B 35/52* | (2006.01) | |
| *C04B 35/524* | (2006.01) | |
| *C04B 35/591* | (2006.01) | |
| *C04B 35/76* | (2006.01) | |
| *C04B 35/80* | (2006.01) | |
| *C04B 35/83* | (2006.01) | |
| *B82Y 30/00* | (2011.01) | |

(52) U.S. Cl.
CPC .......... *C04B 35/524* (2013.01); *C04B 35/591* (2013.01); *C04B 35/64* (2013.01); *C04B 35/76* (2013.01); *C04B 35/806* (2013.01); *C04B 35/83* (2013.01); *C04B 2235/386* (2013.01); *C04B 2235/3821* (2013.01); *C04B 2235/3856* (2013.01); *C04B 2235/3886* (2013.01); *C04B 2235/421* (2013.01); *C04B 2235/422* (2013.01); *C04B 2235/46* (2013.01); *C04B 2235/48* (2013.01); *C04B 2235/5248* (2013.01); *C04B 2235/5288* (2013.01); *C04B 2235/5454* (2013.01); *C04B 2235/602* (2013.01); *C04B 2235/604* (2013.01); *C04B 2235/658* (2013.01); *C04B 2235/6581* (2013.01); *C04B 2235/80* (2013.01); *C04B 2235/95* (2013.01); *C04B 2235/9661* (2013.01)

(56) References Cited

U.S. PATENT DOCUMENTS

| | | | |
|---|---|---|---|
| 5,730,915 A | * | 3/1998 | Cornie .................. B22C 1/00 164/23 |
| 9,045,374 B2 | * | 6/2015 | Keller .................. C01B 31/36 |
| 2005/0238835 A1 | | 10/2005 | Sung |
| 2009/0170998 A1 | | 7/2009 | Gupta et al. |
| 2011/0030950 A1 | | 2/2011 | Weaver et al. |
| 2011/0200748 A1 | | 8/2011 | Eberling-Fux et al. |

OTHER PUBLICATIONS

Search Report and Written Opinion in PCT/US2013/037566 (Feb. 5, 2014).
Search Report in EP13784805.7 (Feb. 5, 2016).

* cited by examiner

FORMATION OF BORON CARBIDE-BORON NITRIDE CARBON COMPOSITIONS

This application is a divisional application of U.S. Pat. No. 8,815,381 issued on Aug. 26, 2014, which claims the benefit of U.S. Provisional Application No. 61/669,201, filed on Jul. 9, 2012, and which is a continuation in part application of U.S. Pat. No. 8,865,301 issued on Oct. 21, 2014, which is a continuation in part application of U.S. Pat. No. 8,822,023 issued on Sep. 2, 2014, which claims priority to U.S. Provisional Application No. 61/590,852, filed on Jan. 26, 2012, U.S. Provisional Application No. 61/640,744, filed on May 1, 2012, U.S. Provisional Application No. 61/669,201, filed on Jul. 9, 2012, and U.S. Provisional Application No. 61/693,930, filed on Aug. 28, 2012. These applications and all other publications and patent documents referred to throughout this nonprovisional application are incorporated herein by reference.

TECHNICAL FIELD

The present disclosure is generally related to synthesis of boron carbide and boron nitride.

DESCRIPTION OF RELATED ART

Boron carbide is a highly refractory material that is of great interest for both its structural and electronic properties. Of particular importance are its low density, high-temperature stability, high hardness, high chemical stability, high cross-section for neutron capture, and excellent high-temperature thermoelectric properties. Boron carbide is the third hardest material next to diamond and cubic boron nitride, having a Vickers hardness of 3770 kg/mm$^2$. Combined with its low density (2.52 g/cm$^3$), it is the premier material for personal armor, typically in the form of front and back inserts into flak jackets in which $B_4C$ plates are bonded to a polymer backing. The combination of properties gives rise to numerous applications, including uses as an abrasive wear-resistant material, ceramic armor, a neutron moderator in nuclear reactors, and, potentially, for power generation in deep space flight applications. Its ability to absorb neutrons without forming long lived radio-nuclides make the material attractive as an absorbent for neutron radiation arising in nuclear power plants (commercial and military applications). Nuclear applications of boron carbide include shielding, and control rod and shut down pellets. Boron carbide, in conjunction with other materials, also finds use as ballistic armor (including body or personal armor) where the combination of high hardness, high elastic modulus, and low density give the material an exceptionally high specific stopping power to defeat high velocity projectiles. Due to its high hardness, boron carbide powder is used as an abrasive in polishing and lapping applications, and also as a loose abrasive in cutting applications such as water jet cutting. It can also be used for dressing diamond tools. Other applications include ceramic tooling dies, precision toll pads, evaporating boats for materials testing and mortars and pestles.

While boron carbide powders are easily made by the direct reaction of the elements at high temperatures, new synthetic methods that allow the formation of pure boron carbide in processed shaped forms are necessary for many potential applications. Boron carbide powder is mainly produced by reacting carbon with $B_2O_3$ in an electric arc furnace, through carbothermal reaction of boric acid or boron oxide at high temperatures and the magnesiothermal reaction of boron oxide with Mg metal. For commercial use, $B_4C$ powders usually need to be milled and purified to remove metallic impurities.

In common with other non-oxide materials, boron carbide is difficult to sinter to full density, with hot pressing or sinter hot isostatic pressing (HIP) being required to achieve greater than 95% of theoretical density. Even using these techniques, in order to achieve sintering at realistic temperatures (e.g. 1900-2200° C.), small quantities of additives such as fine carbon or silicon carbide are usually required. The best known additive for $B_4C$ is carbon, most successfully added in the form of phenolic resin, which distributes carbon around the $B_4C$ particles, and also serves as a pressing agent. Up to 98% of near-theoretical density (TD) has been obtained using this additive.

Boron nitride (BN) can be synthesized in hexagonal and cubic forms. Hexagonal boron nitride has received considerable attention because of its advantageous properties such as high thermal conductivity, chemical inertness, optical transparency, and electrical insulation. The hexagonal form (h-BN) corresponding to graphite is the most stable and softest among BN polymorphs and is therefore used as a lubricant (nonconductive relative to graphite) and an additive to cosmetic products. Cubic boron nitride (c-BN) has the same structure as diamond and its properties are similar. Indeed, the hardness of c-BN is inferior only to diamond but its thermal and chemical stability is superior. Recently, BN nanomaterials such as clusters, nanocapsules, nanohorns, and nanotubes have been discovered and extensively studied in the powdered form. These BN nanostructures are expected to be useful as electronic devices, field-effect transistors, high heat-resistant semiconductors, insulator lubricants, nanowires, magnetic nanoparticles, and gas storage materials. Powdered BN nanomaterials are interesting material for many applications such as lubricants, protective and optical coatings, advanced ceramic composites, and mold release liners.

Boron nitride is a white material produced synthetically from reaction of boric acid or boron trioxide with ammonia or urea in a nitrogen atmosphere with the elimination of $H_2O$ and $CO_2$ as by-products, respectively. The resulting disordered (amorphous) BN contains 92-95% boron nitride and 5-8% boron trioxide, which is eliminated somewhat by heating at temperatures about 1500° C. As produced, BN is a powder, which is typically converted to crystalline h-BN during the heating in nitrogen flow above 1500° C., whereas c-BN is made by annealing h-BN powder at even higher temperatures under pressure above 5 GPa.

Boron nitride components can be fabricated by sintering techniques at high pressure and temperatures over 2000° C. with subsequent machining. Shaped parts are made from boron nitride powders containing some boron oxide for better compressibility. Thin films of boron nitride can be obtained by chemical vapor deposition from boron trichloride and nitrogen precursors. Combustion of boron powder in nitrogen plasma at 5500° C. yields ultra fine boron nitride used for lubricants and toners.

At present, attempts to form boron carbide or boride nitride have resulted in either powders or films. This is because these methods rely on the reaction between boron oxide and already formed carbon for $B_4C$ under an argon atmosphere and a boron oxide and a nitrogen sources (ammonia or urea) for BN under a nitrogen atmosphere. When these mixtures are heated at elevated temperatures, the result is the formation of the designated carbide or nitride as a powder in a classic nucleation-and-growth scheme. The microsized powder ceramic product must then be heated under high pressure and at temperature over 2000° C. to consolidate to a hard shaped component, which is very brittle due to the grain boundaries.

BRIEF SUMMARY

Disclosed herein is a composition comprising nanoparticles of boron carbide and a carbonaceous matrix. The composition is not in the form of a powder.

Also disclosed herein is a composition comprising boron and an organic component. The organic component is selected from an organic compound having a char yield of at least 60% by weight and a thermoset made from the organic compound.

Also disclosed herein is a method comprising combining boron and an organic compound having a char yield of at least 60% by weight to form a precursor mixture.

Also disclosed herein is a method comprising: providing a precursor mixture boron and an organic compound; heating the precursor mixture in an inert atmosphere at elevated pressure and at a temperature that causes polymerization of the organic compound to a thermoset to form a boron-thermoset composition; and heating the boron-thermoset composition in an inert atmosphere, argon, nitrogen, or vacuum at a temperature that causes formation of a ceramic comprising nanoparticles of boron carbide in a carbonaceous matrix. The organic compound has a char yield of at least 60% by weight when heated at the elevated pressure.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
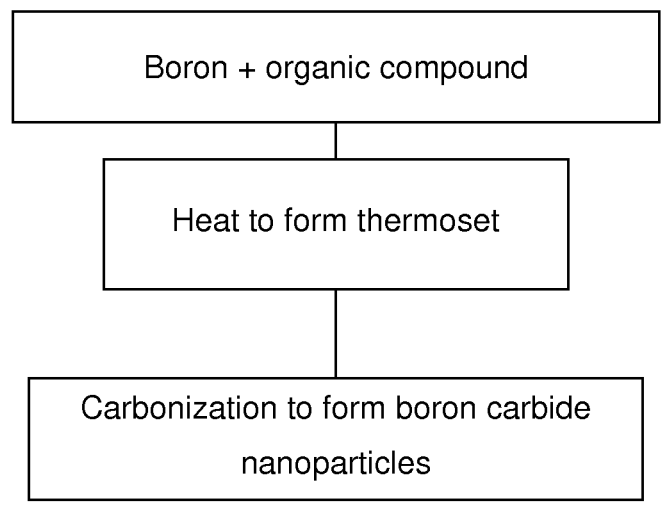
FIG. 1 schematically illustrates a process for forming the disclosed compositions.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein is (1) a method for the in situ formation of nanoparticle boron carbide ($B_4C$) and nanoparticle boron nitride (BN) from reaction of elemental boron with a meltable carbon precursor with or without a carbon matrix in one step affording a shaped composition with structural integrity, (2) various elemental boron-carbon precursor/thermoset compositions at multiple stages, (3) various nanoparticle boron carbide-carbon matrix compositions, (4) various nanoparticle boron nitride-carbon matrix compositions, (5) various nanoparticle boron carbide-boron nitride-carbon matrix compositions (6) fiber reinforced boron-carbide and boron carbide-carbon matrix composites, and (7) fiber reinforced boron carbide and boron nitride-carbon matrix composites.

In the methods disclosed herein, elemental boron is combined with a carbon precursor. When the same reaction is performed in a flow of nitrogen, boron nitride (outer surface) and boron carbide (interior)-carbon matrix compositions are also formed in a stoichiometric array. The carbon precursors are compounds such as polymers or resins with functional unsaturation to permit the carbon precursor to undergo conversion from the melt to form shaped thermosets or crosslinked polymers. A typical composition includes the carbon precursor and the elemental boron. Upon heating the composition, the carbon precursor melts at its melting point and is thermally converted to a shaped solid thermoset through reaction of the unsaturated sites. Thermal treatment of the shaped thermoset above 500° C. results in carbonization of the carbon precursor yielding carbon atoms that react in an argon atmosphere with the boron particles affording boron carbide nanoparticles, which are embedded in the excess carbon. The temperatures at which the synthetic process occurs are well below those normally associated with the formation of boron carbide and nitride ceramics from reaction of the boron source with graphitic carbon. By its very nature, the method permits the carbide or nitride and carbide- or nitride-carbon composites to be easily shaped by molding procedures (injection molding, vacuum molding, pressure molding, spreading, etc), which is a far less costly and involved process than machining a hot press sintered material.

The present methods can create carbides or nitrides as nanoparticles from reaction of elemental boron with a meltable carbon precursor with fast reaction of the "hot" carbon atoms being formed during the carbonization process affording boron carbide nanoparticles (argon atmosphere) within a relatively narrow size range and with boron nitride nanoparticles (nitrogen atmosphere) being formed on the exterior portion of the solid ceramic exposed to nitrogen gas. Thin films of boron nitride nanoparticles within a carbon matrix can also be formed.

An excess of carbon ensures the formation of a carbon matrix in which the boron carbide nanoparticles are embedded, or the reaction can be conducted stoichiometrically to yield only boride carbide nanoparticles or boride carbide nanoparticles with a trace of carbon matrix. The amount of boron carbide and carbon within the resulting composition can be varied based on the quantity of each individual component (elemental boron and melt processable carbon compound) mixed for usage in the precursor composition. When the reaction is performed in a nitrogen atmosphere, the boron preferentially reacts with the nitrogen, especially on the exterior part of a shaped component, relative to the carbon affording the corresponding boron nitride in pure form. Nitrogen cannot progress very far into the solid shaped sample ensuring boride carbide formation in the interior portion of any solid component.

Regardless of the ratio of elemental boron to carbon source, the boron carbides or nitrides may form as nanoparticles. This is a highly desirable result, as it is generally accepted that homogeneous nanoparticle composites of ceramics will have better properties than their much more common microparticle counterparts.

Carbon, ceramic, and metal fibers may be incorporated into various mixtures of precursor compositions composed of elemental boron and the acetylenic-containing aromatic compounds or polymers (carbon source) and the resulting fiber-containing mixture is converted to a shaped solid at temperatures below 500° C. followed by heating to temperatures around 1000-1300° C. yielding a carbon-fiber reinforced boron carbide-carbon matrix composite. The precursor compositions (elemental boron and carbon precursor) described above are mixed with continuous carbon fibers or chopped carbon fibers and heated until conversion to the shaped thermoset forms. The fibers may also be, for example, metal or ceramic. Heating of the carbon-fiber reinforced thermoset above 500° C. in an inert atmosphere (argon) results in the formation of the carbon fiber reinforced boron carbide-carbon matrix composites. The tough, solid carbon fiber ceramic composite can be used for structural applications (e.g., flak jacket/bullet proof vest, armor components on tanks, ships, and aircraft, and nuclear reactors) for usage from room temperature to >3000° C. The precursor composition can contain various combinations of elemental boron and carbon precursor that will lead to shaped ceramics with numerous amounts of boron carbide nanoparticles embedded in a carbon matrix/composite.

As noted above, when the elemental boron and carbon precursor composition are heated in a nitrogen atmosphere, boron nitride nanoparticles form as a layer on the exterior portion of the ceramics. Therefore, another composition would be the formation of boron nitride-carbon matrix compositions, which is a direct interaction of nitrogen with the boron atoms of the precursor boron. Thus, by changing the atmosphere for performing the reaction, one can selectively form either the boron carbide carbon-matrix composition or the boron nitride carbon-matrix composition or combinations thereof. When the fiber-containing precursor compositions are heated in a nitrogen atmosphere on thin films, fiber reinforced boron nitride-carbon matrix composites may be formed. Regardless of the inert atmosphere (argon or nitrogen), the composite may have outstanding oxidative stability and temperature capabilities in excess of 3000° C.

The synthetic method may produce boron carbides and boron nitrides in shaped solid configurations from reaction of elemental boron with a meltable carbon precursor at elevated temperatures above 600° C. Mixed phases of $B_4C$ and BN can also be produced. The $B_4C$ and BN can be produced as nanoparticles from the reaction of the boron with carbon atoms and nitrogen, respectively, during the pyrolysis reaction. When (a) powdered boron even in micro sized particles is combined with (b) carbon precursors that melt and only contain carbon and hydrogen followed by (c) heating to a temperature that converts the precursor into a solid thermoset in which the boron is homogeneously embedded within the solid composition, the combination can be (d) thermally converted to a solid shaped ceramic solid containing high yields of pure boron carbide nanoparticles or boron nitride nanoparticle or combinations thereof depending on whether the reaction is performed in argon or nitrogen. The appropriate boron nanoparticle ceramics are formed in situ from the interaction of the boron particles with the carbon atoms of the carbon precursor or with nitrogen during the thermal treatment from 600-1300° C. The carbon sources may be melt processable aromatic-containing acetylenes or low molecular weight polymers that exhibit extremely high char yields to ensure high density, void-free solid components. The carbon precursor may contain only C and H to insure that pure boron carbide and boron nitride are controllably produced during the reaction. The boron carbide and boron nitride form above 600° C. with the reaction occurring faster at higher temperatures. When an excess of the carbon precursor is used, the individually formed ceramic nanoparticles (boron carbide or boron nitride) are glued or bound together with the resulting nanostructured or amorphous elastic carbon to afford structural integrity.

Figure 2:
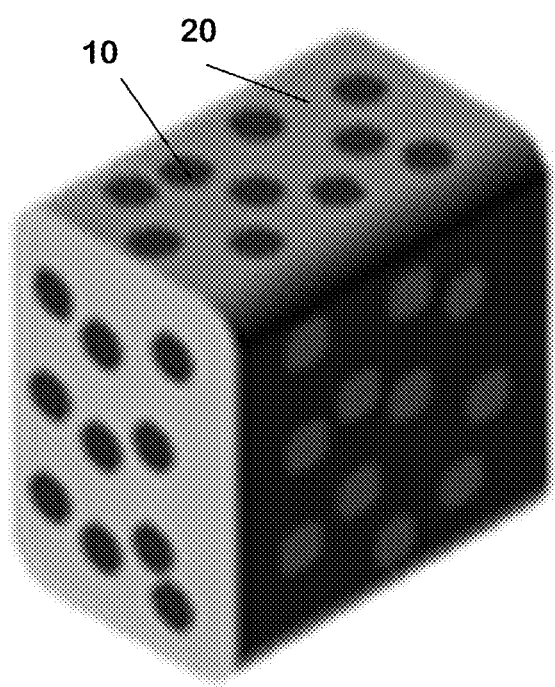
FIG. 2 schematically illustrates boron particles 10 embedded in a thermoset matrix 20.
Figure 3:
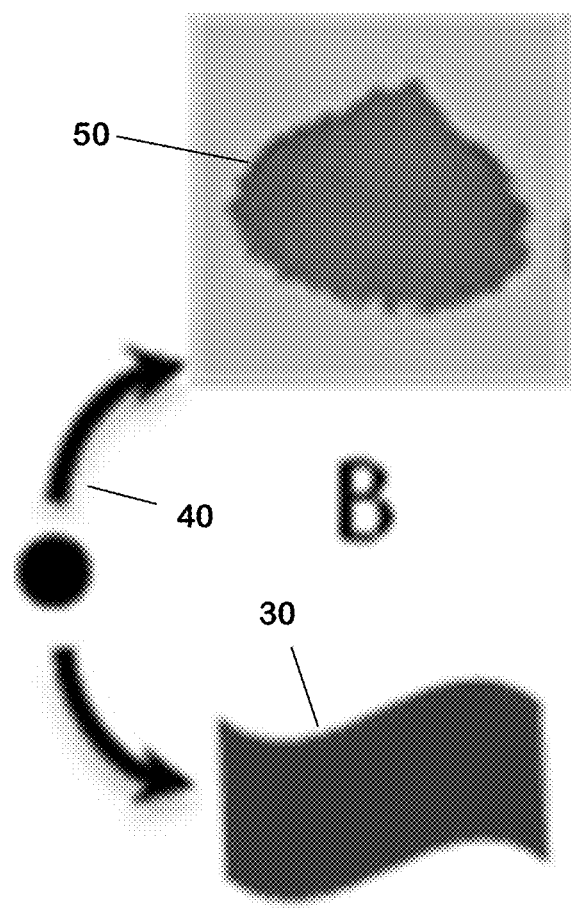
FIG. 3 schematically illustrates the transfer 40 of carbon atoms from the carbon matrix 30 to the boron 50.
Figure 4:
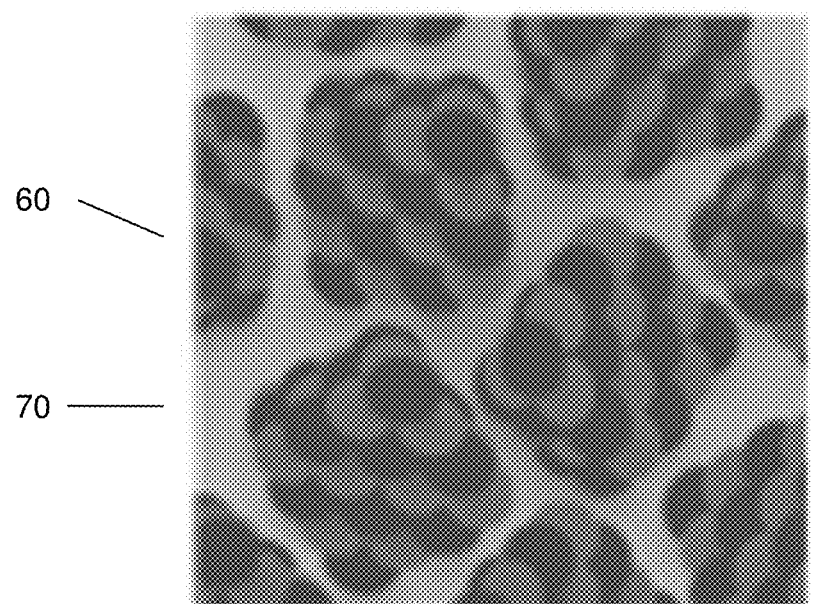
FIG. 4 schematically illustrates boron carbide nanoparticles 60 in a carbonaceous matrix 70.

The process is outlined in FIG. 1 and schematically illustrated in FIGS. 2-4. Any reactions described are not limiting of the presently claimed methods and compositions. Even though microsized boron powder is used in the reaction, the boron carbide and boron nitride may be produced as nanoparticles from the reaction of the highly reactive carbon atom, being produced during pyrolysis (carbonization) of the carbon precursor, with the activated boron surface, thereby lowering the temperature of $B_4C$ or BN formation. Moreover, by varying the amount of elemental boron, which forms reactive boron ceramic nanoparticles, relative to the carbon precursor, the amount of $B_4C$ or BN can be readily changed with respect to the amount of carbon matrix in order to vary the properties of the resulting solid composition. The nanoparticle-containing $B_4C$ or BN carbon-matrix composites are expected to exhibit unique physical properties such as hardness and toughness, owing to the high surface area of the nanoparticles and the presence of the relatively elastic carbon, which would exist in forms ranging from amorphous to nanotube to graphitic carbon.

The native presence of an "elastic" carbon matrix may allow for toughening of the inherently brittle sintered ceramics. The carbon permits operation of the toughened ceramic at extremely high temperatures, owing to carbon's high melting point (>3000° C.). Ceramic/carbon-matrix compositions are currently being sought for these reasons, and the present method may permit straightforward preparation of shaped solid composites in a single step for the first time, in contrast to the traditional means of first forming the ceramic powder and then preparing the carbon-matrix composite under sintering conditions. Only trace or very small amounts of carbon matrix may be needed to achieve the effect. Also, the ratio of ceramic to carbon is easily tuned based only on the ratio of elemental boron to carbon-precursor.

Fiber or carbon fiber-reinforced boron carbide and boron nitride carbon matrix composites may exhibit outstanding mechanical properties for usage under extreme environmental high temperature conditions, as armor, and for nuclear rod/structural application. Such materials do not currently exist. Finely divided fiber reinforced boron ceramic carbon composites can allow the consolidation of fully dense shaped, low density, solid components with extreme fracture resistance for uses in high stress and temperature applications such as advanced engine components for hypersonic vehicles and automobiles, where increased operation temperature and mechanical integrity could translate into tremendous economic advantages. Such tough, easily shaped ceramic composites could be significant to the next generation of army tanks, which can be designed to be more energy efficient and lighter weight than those in current service, and in advanced automobile engines and supporting components. In addition, a more robust nuclear reactor could be readily fabricated for aircraft carriers needing the superior processability of tough structural rods and housing of the heat resistant boron carbide or boron nitride ceramic-carbon composites. Also, lightweight, tough, and hard ceramics easily made in controllable forms could be very important for the fabrication of superior military armor; again fabricated in a mold in a shaped structure. The ability to fabricate tough, shaped boron carbide or boron nitride components in one step enhances their importance due to the economic advantages and the elimination of machining to a shaped component.

In the first step of the method, two components are combined and may be thoroughly mixed. The first component is boron in elemental form. Suitable boron is readily available in powder form. A 95-97% boron is suitable with a higher pure boron powder (99%) being preferred. The boron powder may be milled to reduce its particle size.

The second component is an organic compound that has a char yield of at least 60% by weight. The char yield may also be as high as at least 70%, 80%, 90%, or 95% by weight. The char yield of a potential compound may be determined by comparing the weight of a sample before and after heating to at least 1000° C. for at least 1 hr in an inert atmosphere such as nitrogen or argon. Any such compounds with high char yields may be used as the charring may play a role in the mechanism of the reactions. This char yield may be measured at an elevated pressure to be used when a heating step is also performed at such pressure. Thus, a compound having a low char yield at atmospheric pressure but having a high char yield under external pressure or the conditions that the disclosed methods are performed may be suitable for producing boron carbides and nitrides.

Certain organic compounds may exhibit any of the following characteristics, including mutually consistent combinations of characteristics: containing only carbon and hydrogen; containing aromatic and acetylene groups; containing only carbon, hydrogen, and nitrogen or oxygen; containing no oxygen; and containing a heteroatom other than oxygen. It may have a melting point of at most 400° C., 350° C., 300° C., 250° C., 200° C. or 150° C. and the melting may occur before polymerization or degradation of the compound or it may be a liquid. Examples of organic compounds include, but are not limited to, 1,2,4,5-tetrakis(phenylethynyl)benzene (TPEB), 4,4'-diethynylbiphenyl (DEBP), N,N'-(1,4-phenylenedimethylidyne)-bis(3-ethynylaniline) (PDEA), N,N'-(1,4-phenylenedimethylidyne)-bis(3,4-dicyanoaniline) (dianilphthalonitrile), and 1,3-bis(3,4-dicyanophenoxy)benzene (resorcinol phthalonitrile) or a prepolymer thereof. More than one organic compound may be used. Prepolymers may also be used, such as a prepolymer of TPEB or other suitable organic compounds. Different compounds can be blended together and/or reacted to a prepolymer stage before usage as the organic compound of the precursor composition. The presence of nitrogen atoms in the organic compound may produce boron nitrides in the ceramic without the use of a nitrogen atmosphere.

An optional component in the precursor materials is a plurality of fibers or other fillers. Examples of fibers include, but are not limited to, carbon fibers, ceramic fibers, and metal fibers. The fibers may be of any dimension that can be incorporated into the mixture and may be cut or chopped to shorter dimensions.

Also, the precursor mixture, including any fibers, may be formed into a shaped component. The component may be shaped under pressure, removed from the pressure, and heated to thermoset and ceramic components as described below.

The precursor mixture, which may be mixed in a melt stage, then undergoes a heating step to form a thermoset composition. This may be performed while the mixture is in a mold. This will allow the final product to have the same shape as the mold, as the organic component of the mixture will melt if not already liquid and the mixture will fill the mold during the heating, and retain its shape when the ceramic is formed. The precursor mixture is heated in an inert atmosphere at a temperature that causes polymerization of the organic compound to a thermoset. If the organic compound is volatile, the heating may be performed under pressure, either physical or gas pressure, to avoid evaporation of the organic compound. Suitable heating temperatures include, but are not limited to, 150-500° C. or 700° C.

Heating the precursor may also cause the polymerization of the organic compound to a thermoset. The boron particles 10 would then be dispersed throughout the thermoset 20 as shown in FIG. 2. A thermoset having the boron particles dispersed throughout may be used as a final product. The thermoset may also be machined to a desired shape, followed by heating to form a ceramic as described below.

The boron may be homogeneously distributed or embedded in the thermoset as an intermediate shaped solid. At this stage, the composition may have a shape that it will retain upon further heating and conversion to the ceramic from reaction of the boron with the developing carbon matrix.

The precursor mixture may be consolidated to a shaped solid component under pressure to promote intimate contact of the reactants to provide a very dense ceramic solid or to densify the final product. The precursor mixture may be compacted under exterior pressure, removed from the pressure, and then heated to a thermoset followed by conversion to the ceramic. Alternatively, the precursor mixture may be compacted under exterior pressure and the pressure maintained while heating to the thermoset and ceramic.

In a second heating step, the thermoset composition is heated to form a ceramic. The heating is performed at a temperature that causes formation of nanoparticles of boron carbide 60 in a carbonaceous matrix 70 (FIG. 4). The carbonaceous matrix may comprise graphitic carbon, carbon nanotubes, and/or amorphous carbon. If nitrogen is present, boron nitride nanoparticles may be formed. There may be a higher concentration of nitrides on the surface than in the interior. Suitable heating temperatures include, but are not limited to 500-1900° C.

The presence and composition of the boron carbide or boron nitride nanoparticles may be verified by any known technique for detecting nanoparticles such as SEM, TEM, or XRD. The nanoparticles may have an average diameter of less than 100 nm, 50 nm, or 30 nm. They may be generally spherical in shape or may be non-spherical, such as nanorods.

The ceramic may include any amount of nanoparticles, including but not limited to, at least 5%, 10%, 20%, 30%, 40%, 50%, 60%, 70%, 80%, 90%, 95%, or 99% by weight of nanoparticles. The percentage of nanoparticles may be in part determined by the molar ratio of boron and carbon atoms in the precursor mixture. At a 1:1 ratio, nearly all of the boron and carbon may be incorporated into the nanoparticles, leaving a small amount or trace of carbonaceous matrix. With higher amounts of organic compound, the fraction of boron carbide nanoparticles is lower and the fraction of carbonaceous matrix is higher. By this method, variations in the ratio of boron to organic may be used, affording a mixture of boron carbide and carbon matrix when performed in an inert atmosphere such as argon and boron carbide, boron nitride, and carbon matrix when performed in a nitrogen atmosphere. When boron nitride is made, raising the amount of carbon in the precursor mixture may lower the amount of boron nitride in the ceramic.

The ceramic is not formed as a powder and may be in the form of a solid, unbroken mass. It may contain less than 20% by volume of voids or as low as 10%, 5%, or 1%. It may have the same shape as the precursor mixture (if solid) or it may take on the shape of a mold it was placed in during the heating. The ceramic may retain its shape in that it does not crumble when handled and may not change shape or break without the use of extreme force. The ceramic composition may be tough, hard, and have structural integrity. The degree of such properties may depend on the amount of ceramic to carbon in the solid ceramic composition. Any shape may be formed to make an article useful for incorporation into an apparatus. The article may be large enough to have a minimum size of at least 1 cm in all dimensions. That is, the entire surface of the article is at least 5 mm from the center of mass of the article. Larger articles may be made, such as having a minimum size of at least 10 cm in all dimensions. Also, the composition may have smaller sizes, such as 1 mm, 2 mm, or 5 mm.

The following examples are given to illustrate specific applications. These specific examples are not intended to limit the scope of the disclosure in this application.

EXAMPLE 1

Formulation of Precursor Composition of TPEB and Boron in Molar Ratio of 1 to 168

TPEB (0.250 g; 0.523 mmol) and powdered boron (0.905 g, 87.9 mmol) were thoroughly mixed and used as the precursor composition for the formation of refractory nanoparticle boron carbide ($B_4C$) embedded or bonded with the excess of carbon that behaves as a matrix material. The ratio of the two reactants can be readily varied by the described formulation method.

EXAMPLE 2

Conversion of Precursor Composition of TPEB and Boron in Molar Ratio of 1 to 168 to Polymeric Thermoset Solid in an Argon Atmosphere A sample (57.3330 mg) of the precursor composition of Example 1 was weighed into a TGA ceramic pan, packed thoroughly, flushed with flow (110 cc/min) of argon for 20 minutes, and then heated at 5° C./min to and held at 250° C. for 1 hr to consolidate to a shaped thermoset solid from reaction of the ethynyl units of TPEB.

EXAMPLE 3

Conversion of Polymeric Thermoset Solid to Shaped Boron Carbide Solid Ceramic Composition by Heating to 1300° C. under an Argon Atmosphere The solid polymeric thermoset of Example 2 was heated at 2° C./min to and held at 1300° C. for 3 hr under a flow (110 cc/min) of argon. The resulting solid ceramic sample retained 89.68% of the original weight. XRD analysis showed the formation of pure boron carbide ($B_4C$) nanoparticles of 9.8 nm average particle size.

EXAMPLE 4

Formulation of Precursor Composition of TPEB and Boron in Ratio of 1 to 136

TPEB (0.250 g; 0.523 mmol) and powdered boron (0.769 g, 71.1 mmol) were thoroughly mixed and used as the precursor composition for the formation of refractory nanoparticle $B_4C$ embedded or bonded with the excess of carbon that behaves as a matrix material. The ratio of the two reactants can be readily varied by the described formulation method.

EXAMPLE 5

Conversion of Precursor Composition of TPEB and Boron in Molar Ratio of 1 to 136 to Polymeric Thermoset Solid in an Argon Atmosphere A sample (62.7640 mg) of the precursor composition of Example 4 was weighed into a TGA ceramic pan, packed thoroughly, flushed with flow (110 cc/min) of argon for 20 minutes, and then heated at 5° C./min to and held at 250° C. for 1 hr to consolidate to a shaped thermoset solid.

EXAMPLE 6

Conversion of Polymeric Thermoset Solid to Shaped Boron Carbide Solid Composition by Heating to 1300° C. under an Argon Atmosphere The solid polymeric thermoset of Example 5 was heated at 2° C./min to and held at 1300° C. for 3 hr under flow (110 cc/min) of argon. The resulting solid ceramic sample retained 91.17% of the original weight. XRD analysis showed the formation of pure boron carbide ($B_4C$) nanoparticles of 11.9 nm average particle size.

EXAMPLE 7

Formulation of Precursor Composition of TPEB and Boron in Molar Ratio of 1 to 152

TPEB (0.500 g; 1.05 mmol) and powdered boron (1.72 g, 159 mmol) were thoroughly mixed and used as the precursor composition for the formation of refractory nanoparticle $B_4C$ embedded or bonded with the excess of carbon that behaves as a matrix material. The ratio of the two reactants can be readily varied by the described formulation method.

EXAMPLE 8

Conversion of Precursor Composition of TPEB and Boron in Molar Ratio of 1 to 152 to Polymeric Thermoset Solid in an Argon Atmosphere A sample (61.8470 mg) of the precursor composition of Example 7 was weighed into a TGA ceramic pan, packed thoroughly, flushed with flow (110 cc/min) of argon at for 20 minutes, and then heated at 5° C./min to and held at 250° C. for 1 hr to consolidate to a shaped thermoset solid.

EXAMPLE 9

Conversion of Polymeric Thermoset Solid to Shaped Boron Carbide Solid Composition by Heating to 1300° C. under an Argon Atmosphere The solid polymeric thermoset of Example 8 was heated at 3° C./min to and held at 1300° C. for 3 hr under flow of argon at 110 cc/min. The resulting solid ceramic sample retained 87.81% of the original weight. XRD analysis showed the formation of pure boron carbide nanoparticles with the average particle size for boron carbide being 14.8 nm. Any excess carbon exists in the amorphous phase.

EXAMPLE 10

Conversion of Precursor Composition of Boron and TPEB in Molar Ratio of 1 to 152 to Polymeric Thermoset Solid in a Nitrogen Atmosphere A sample (55.9070 mg) of the precursor composition of Example 7 was weighed into a TGA ceramic pan, packed thoroughly, flushed with flow (110 cc/min) of nitrogen for 20 minutes, and then heated at 5° C./min to and held at 250° C. for 1 hr to consolidate to a shaped thermoset solid.

EXAMPLE 11

Figure 5:
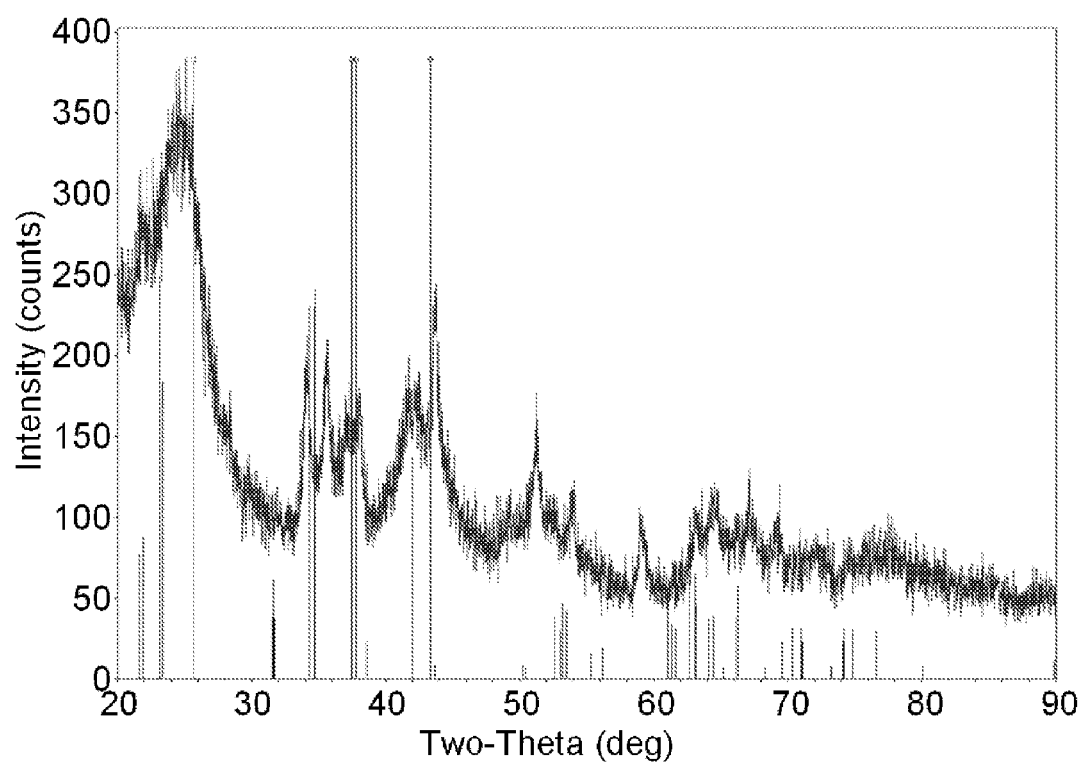
FIG. 5 shows an X-ray diffraction analysis (XRD) of a sample containing $B_4C$ and BN nanoparticles.

Conversion of Polymeric Thermoset Solid to Shaped Boron Carbide/Boron Nitride Solid Composition by Heating to 1300° C. under a Nitrogen Atmosphere The solid polymeric thermoset of Example 10 was heated at 3° C./min to and held at 1300° C. for 3 hr under 110 cc/min flow of nitrogen. The resulting solid ceramic sample gained weight relative to the original weight of the precursor composition of Example 10 with an increase of weight to approximately 104.9%. XRD analysis (FIG. 5) showed the formation of pure boron carbide and boron nitride nanoparticles, which are embedded in an extremely small amount of carbon. The boron nitride nanoparticles are multiple phases of boron nitride and are being mainly formed on the exterior part or outer surface of the sample, which was exposed to the nitrogen. The boron carbide nanoparticles are mainly formed on the interior portion of the sample.

EXAMPLE 12

Formulation of Precursor Composition of TPEB and Boron in Molar Ratio of 1 to 159

TPEB) (0.500 g; 1.05 mmol) and powdered boron (1.81 g, 167 mmol) were thoroughly mixed and used as the precursor composition for the formation of refractory nanoparticle $B_4C$ embedded or bonded with the excess of carbon that behaves as a matrix material. The ratio of the two reactants can be readily varied by the described formulation method.

EXAMPLE 13

Conversion of Precursor Composition of TPEB and Boron in Molar Ratio of 1 to 152 to Polymeric Thermoset Solid in an Argon Atmosphere A sample (47.4790 mg) of the precursor composition of Example 12 was weighed into a TGA ceramic pan, packed thoroughly, flushed with flow (110 cc/min) of argon for 20 minutes, and then heated at 10° C./min to and held at 250° C. for 1 hr to consolidate to a shaped thermoset solid. The experiment was designed to have approximately 4 boron atoms to every carbon atom in an effort to prepare pure boron carbide.

EXAMPLE 14

Figure 6:
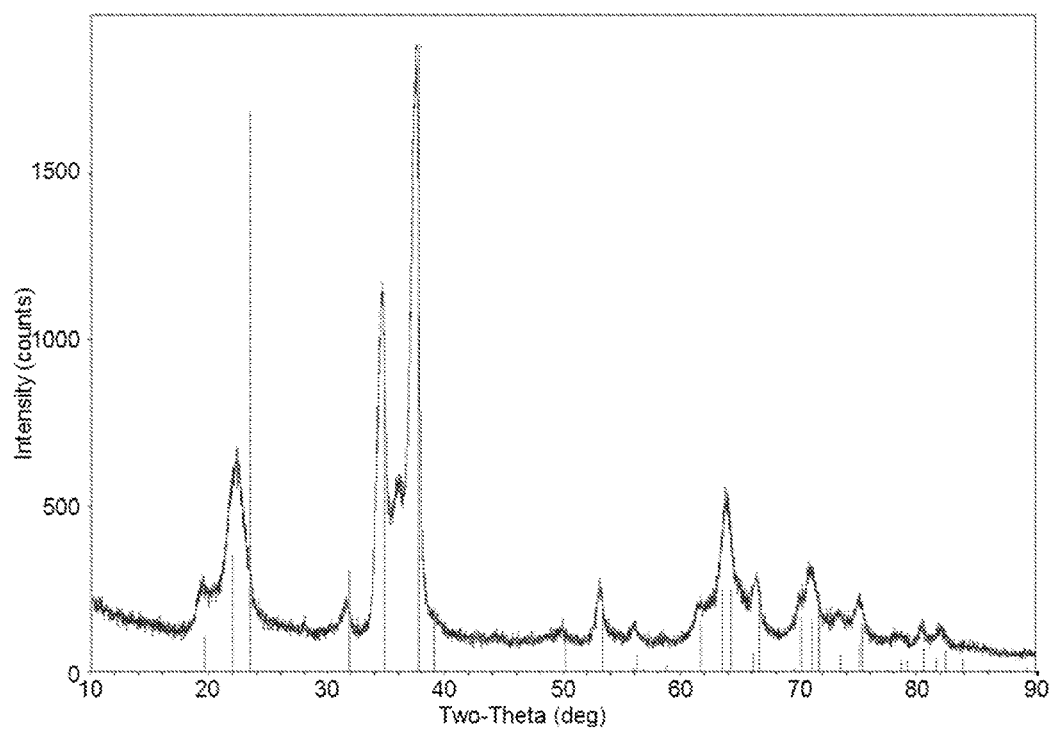
FIG. 6 shows an XRD of a sample containing $B_4C$ nanoparticles.

Conversion of Polymeric Thermoset Solid to Shaped Boron Carbide Solid Composition by Heating to 1300° C. under an Argon Atmosphere The solid polymeric thermoset of Example 13 was heated at 3° C./min to and held at 1300° C. for 3 hr under flow of argon at 110 cc/min. The resulting solid ceramic sample retained 87.80% of the original weight. XRD analysis (FIG. 6) showed almost 100% pure boron carbide nanoparticles consolidated as a solid. The average particle size for the boron carbide nanoparticles was 9.7 nm.

EXAMPLE 15

Formulation of Precursor Composition of TPEB and Boron in Molar Ratio of 1 to 38

TPEB (0.500 g; 1.05 mmol) and powdered boron (0.429 g, 39.7 mmol) were thoroughly mixed and used as the precursor composition for the formation of refractory nanoparticle $B_4C$ embedded or bonded with the large excess of carbon that behaves as a matrix material. The ratio of the two reactants can be readily varied by the described formulation method.

EXAMPLE 16

Conversion of Precursor Composition of TPEB and Boron in Molar Ratio of 1 to 38 to Polymeric Thermoset Solid in an Argon Atmosphere A sample (47.4790 mg) of the precursor composition of Example 15 was weighed into a TGA ceramic pan, packed thoroughly, flushed with flow (110 cc/min) of argon for 20 minutes, and then heated at 5° C./min to and held at 250° C. for 1 hr to consolidate to a shaped thermoset solid.

EXAMPLE 17

Figure 7:
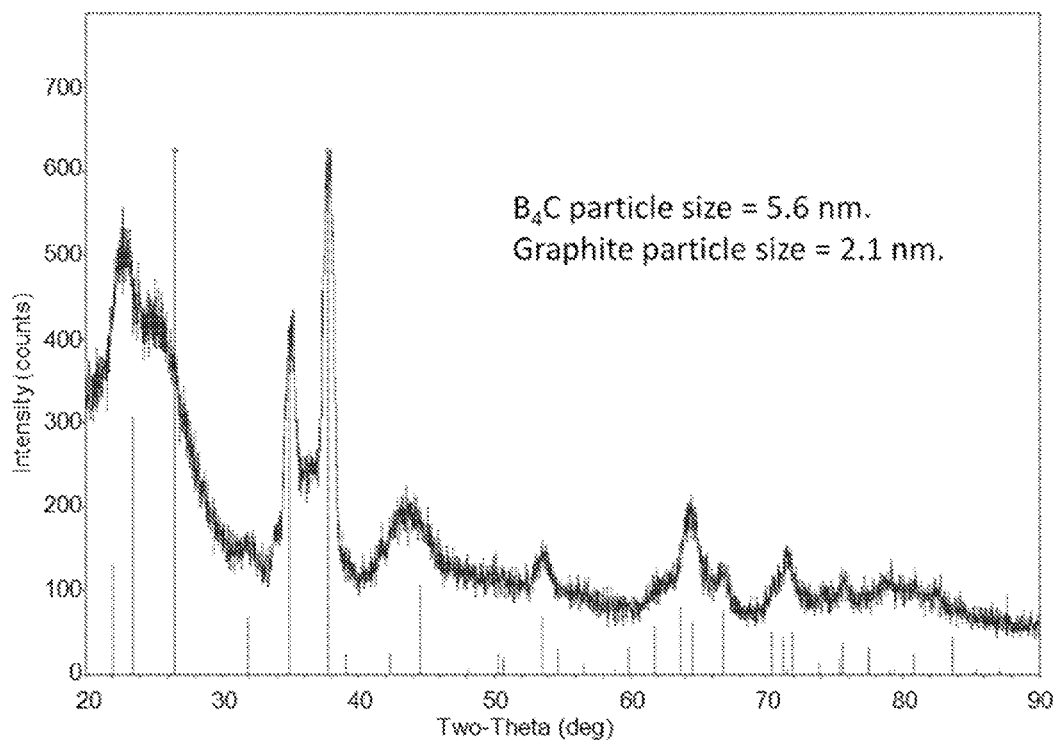
FIG. 7 shows an XRD of another sample containing $B_4C$ nanoparticles.

Conversion of Polymeric Thermoset Solid to Shaped Boron Carbide Solid Composition by Heating to 1300° C. under an Argon Atmosphere The solid polymeric thermoset of Example 16 was heated at 3° C./min to and held at 1300° C. for 3 hr under flow of argon at 110 cc/min. The resulting solid ceramic sample retained 87.80% of the original weight. XRD analysis (FIG. 7) showed the formation of pure boron carbide nanoparticles (60%) embedded in an excess of crystalline carbon (40%). The average particle size for the boron carbide nanoparticles and crystalline carbon are 5.6 nm and 2.1 nm, respectively.

EXAMPLE 18

Conversion of Precursor Composition of TPEB and Boron in Molar Ratio of 1 to 38 to Polymeric Thermoset Solid in a Nitrogen Atmosphere A sample (55.9070 mg) of the precursor composition of Example 15 was weighed into a TGA ceramic pan, packed thoroughly, flushed with flow (110 cc/min) of nitrogen for 20 minutes, and then heated at 5° C./min to and held at 250° C. for 1 hr to consolidate to a shaped thermoset solid.

EXAMPLE 19

Conversion of Polymeric Thermoset Solid to Shaped Boron Carbide/Boron Nitride Solid Composition by Heating to 1300° C. under a Nitrogen Atmosphere The solid polymeric thermoset of Example 18 was heated at 3° C./min to and held at 1300° C. for 3 hr under 110 cc/min flow of nitrogen. The resulting solid ceramic sample gained weight relative to the original weight of the sample of Example 18 with an increase of weight to 104.9%. XRD analysis showed the formation of pure boron carbide and boron nitride nanoparticles (60%) embedded in an excess of crystalline carbon (40%). The average particle size for the boron carbide/nitride nanoparticles and crystalline carbon are 5.6 nm and 2.1 nm, respectively. The boron nitride was mainly formed on the exterior part or outer surface of the sample, which was exposed to the nitrogen.

EXAMPLE 20

Formation of Boron and TPEB Carbon Fiber Polymeric Composite in an Argon Atmosphere Into a 0.5" diameter mold fabricated from aluminum foil was placed a precursor composition (2.1357 g of powdered boron and TPEB mixture) prepared as in Example 15 and a small amount of chopped carbon fibers was added and mixed. The composition was packed and heated to 240° C. to melt the TPEB and the melted composition was pressed with a flat surface to consolidate the sample to a flat surface. The resulting carbon fiber-precursor composition was heated under a flow of argon at 260-270° C. for 1 hr resulting in solidification to a solid carbon fiber-containing polymeric thermoset. The solid carbon fiber polymeric composite with a homogeneous distribution of the boron powder was removed from the mold.

EXAMPLE 21

Conversion of the Boron-Containing Carbon Fiber Polymeric Composite to Solid Boron Carbide Carbon Fiber Ceramic Composite in an Argon Atmosphere The shaped solid carbon fiber polymeric composite prepared in Example 20 was placed in an oven and heated under a flow of argon at 3° C./min to 1300° C. and held at the temperature for 3 hr. The resulting ceramic ($B_4C$)-carbon fiber reinforced solid composite was cooled at 3° C./min back to room temperature. The solid fibrous $B_4C$-containing carbonaceous ceramic appeared hard and tough.

EXAMPLE 22

Formation of Boron and TPEB Carbon Fiber Polymeric Composite in an Argon Atmosphere Into a 0.5" diameter mold fabricated from aluminum foil was placed a precursor composition (2.3328 g of powdered boron and TPEB mixture) prepared as in Example 1 and a small amount of chopped carbon fibers was added and mixed. The composition was packed and heated under a flow of argon to 250° C. to melt the TPEB and the melted composition was pressed with a flat surface to consolidate the sample to a flat surface. The resulting carbon fiber-precursor composition was heated under a flow of argon at 260-270° C. for 1 hr resulting in solidification to a solid carbon fiber-containing polymeric thermoset. The solid carbon fiber polymeric composite with a homogeneous distribution of the boron powder was removed from the mold.

EXAMPLE 23

Conversion of the Boron Carbon Fiber Polymeric Composite to Solid Shaped Boron Carbide Carbon Fiber Ceramic Composite in an Argon Atmosphere The solid shaped carbon fiber polymeric composite prepared in Example 22 was placed in an oven and heated under a flow of argon at 3° C./min to 1300° C. and held at the temperature for 3 hr. The resulting ceramic ($B_4C$)-carbon fiber reinforced solid composite was cooled at 3° C./min back to room temperature. The solid fibrous $B_4C$-containing carbonaceous ceramic appeared hard and tough.

EXAMPLE 24

Formulation of Prepolymer Composition of TPEB

TPEB (10.30 g; 21.5 mmol) was placed in an aluminum planchet and heated at 260° C. for 40 minutes or until the mixture was viscous to stir with a metal spatula. The mixture was cooled, broken into small pieces, and ball milled for 2 minutes resulting in a fine black powder.

EXAMPLE 25

Formulation of Precursor Composition of Boron and TPEB Prepolymer and Formation of Shaped Pellet TPEB prepolymer prepared in Example 24 (0.193 g, 0.404 mmol) and boron (0.604 g, 55.9 mmol) were ball milled for 5 minutes resulting in a deep red-black fine powder. The powder was placed in a 13 mm pellet press and pressed to 12,000 pounds for 1 minute.

EXAMPLE 26

Conversion of Precursor Composition of Boron and TPEB Prepolymer to Solid Shaped Thermoset The pellet from Example 25 was placed in a furnace, heated at 20° C./min under an argon atmosphere to 210° C., and held at this temperature for 10 hr (overnight) resulting in the formation of a tough shaped polymeric thermoset solid. The boron powder was homogeneously dispersed in the solid thermoset.

EXAMPLE 27

Heat Treatment of Refractory $B_4C$ Solid Ceramic to 1900° C. under Vacuum

Figure 8:
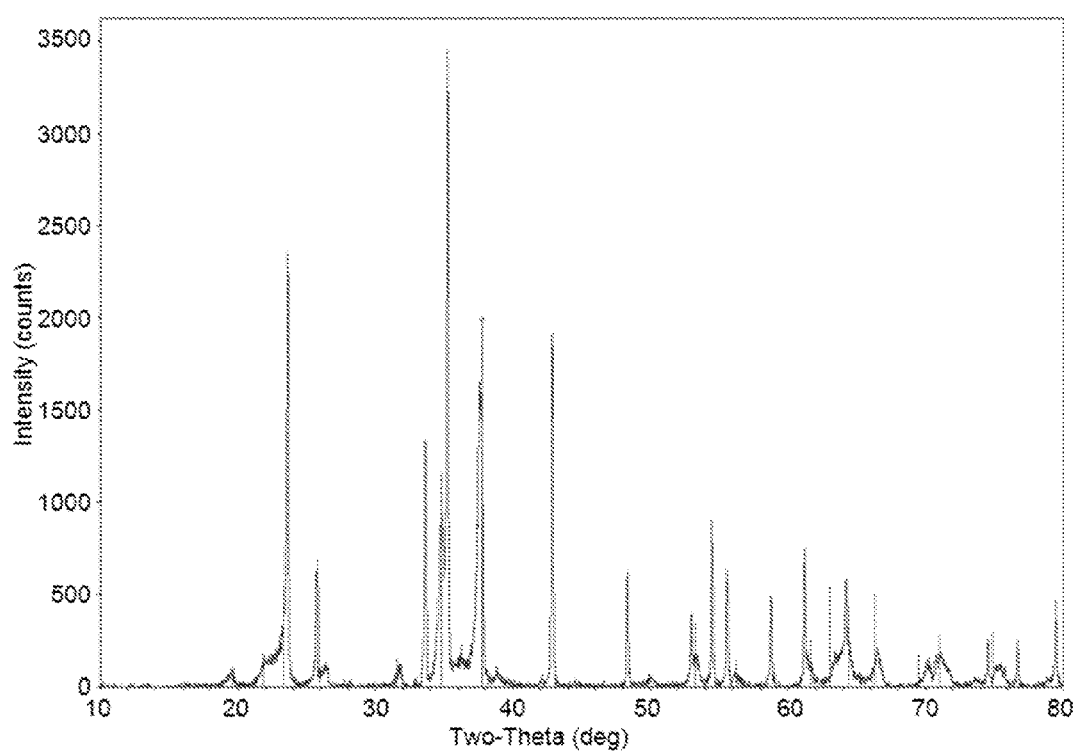
FIG. 8 shows an XRD of another sample containing $B_4C$ nanoparticles in a small amount of carbon matrix.
Figure 9:
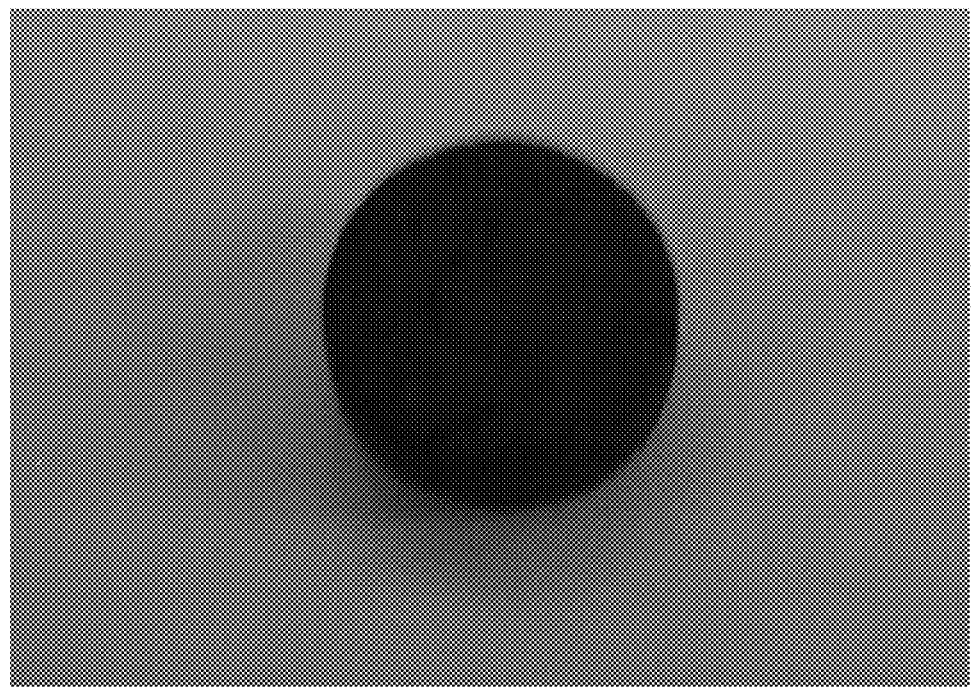
FIG. 9 shows a photograph of a sample containing $B_4C$ nanoparticles.

The shaped polymeric thermoset solid (0.745 g) from Example 26 was placed in a graphitic furnace and heated at 10° C. min⁻ under a vacuum ($10^{-4}$) to 1900° C. and held at 1900° C. for 2 hr yielding a solid dense ceramic with a weight retention of 83.4%. The solid ceramic was removed from the furnace, characterized by XRD (FIG. 8), and found to form larger nanoparticle sized $B_4C$ relative to the 1300° C. heated sample in an excess of carbon as the matrix. The $B_4C$ carbon solid composition (FIG. 9) was formed in one step and exhibited structural integrity.

EXAMPLE 28

Formulation of Precursor Composition of Boron and TPEB Prepolymer, Formation of Shaped Pellet, and Direct Conversion to Refractory $B_4C$ Solid Ceramic Carbon Composition in one Step TPEB prepolymer (0.200 g; 0.418 mmol) prepared as in Example 24 and boron (0.604 g, 55.9 mmol) were ball milled for 5 minutes resulting in a deep red-black fine powder. The powder was placed in a 13 mm pellet press and pressed to 10,000 pounds for 1 minute. The pellet was then placed in a furnace, heated at 20° C./min under an argon atmosphere to 250° C., and held at this temperature for 30 minutes followed by heating at 2° C./min under a flow (100 cc/min) of argon to 1500° C. and holding at 1500° C. for 2 hr yielding a solid dense ceramic with weight retention of 83.4%. Upon cooling, the solid ceramic was removed from the furnace, characterized by XRD, and found to form nanoparticle sized $B_4C$ in an excess of carbon as the matrix. The $B_4C$ carbon solid composition was formed in one step and exhibited great structural integrity, hardness, and toughness.

EXAMPLE 29

Formulation of Precursor Composition of Boron and TPEB Prepolymer and Formation of Shaped Pellet TPEB prepolymer from Example 24 (0.097 g, 0.203 mmol) and boron (0.302 g, 27.9 mmol) were ball milled for 5 minutes resulting in a deep red-black fine powder. The powder was placed in a 6 mm pellet press and pressed to 4,000 pounds for 10 seconds.

EXAMPLE 30

Formation of Nanoparticle Refractory Boron Carbide Ceramic Solid in One Step by Controlled Heating to 1300° C. under an Argon Atmosphere The pellet precursor composition (89.1460 mg) prepared in Example 29 was placed in a TGA chamber, heated at 5° C./min under a 100 cc/min flow of argon to 250° C., and held at 250° C. for 1 hr, followed by heating at 3° C./min to 1300° C. and holding at 1300° C. for 3 hr yielding a solid dense ceramic with a final char yield of 93%. Upon cooling, the solid ceramic was removed from the furnace, characterized by XRD, and found to contain pure boron carbide formed as nanoparticles in a small amount of carbon. The average size of the boron carbide nanoparticle was 4.2 nm. The boron carbide solid nanoparticle composition was formed in one step and exhibited great structural integrity, hardness, and toughness.

EXAMPLE 31

Formulation of Precursor Composition of Boron and TPEB Prepolymer and Formation of Shaped Pellet TPEB prepolymer form Example 24 (0.083 g, 0.174 mmol) and boron (0.302 g, 27.9 mmol) were ball milled for 5 minutes resulting in a deep red-black fine powder. The powder was placed in a 6 mm pellet press and pressed to 4,000 pounds for 10 seconds.

EXAMPLE 32

Formation of Nanoparticle Refractory Boron Carbide Ceramic Solid in One Step by Controlled Heating to 1300° C. under an Argon Atmosphere The pellet precursor composition (106.5130 mg) prepared in Example 31 was placed in a TGA chamber, heated at 5° C./min under a 100 cc/min flow of argon to 250° C., and held at 250° C. for 1 hr, followed by heating at 3° C./min to 1300° C. and holding at 1300° C. for 3 hr yielding a solid dense ceramic with a final char yield of 94%. Upon cooling, the solid ceramic was removed from the furnace, characterized by XRD, and found to contain pure boron carbide formed as nanoparticles in an extremely small amount of carbon. The average size of the boron carbide nanoparticle was 3.7 nm. The boron carbide solid nanoparticle composition was formed in one step and exhibited great structural integrity, hardness, and toughness.

EXAMPLE 33

Formulation of Precursor Composition of Boron and TPEB Prepolymer and Formation of Shaped Pellet TPEB prepolymer form Example 24 (0.090 g, 0.188 mmol) and boron (0.302 g, 27.9 mmol) were ball milled for 5 minutes resulting in a deep red-black fine powder. The powder was placed in a 6 mm pellet press and pressed to 4,000 pounds for 10 seconds.

EXAMPLE 34

Formation of Nanoparticle Refractory Boron Carbide Ceramic Solid in One Step by Controlled Heating to 1300° C. under an Argon Atmosphere The pellet precursor composition (74.7380 mg) prepared in Example 33 was placed in a TGA chamber, heated at 5° C./min under a 100 cc/min flow of argon to 250° C., and held at 250° C. for 1 hr, followed by heating at 3° C./min to 1300° C. and holding at 1300° C. for 3 hr yielding a solid dense ceramic with a final char yield of 93%. Upon cooling, the solid ceramic was removed from the furnace, characterized by XRD, and found to contain pure boron carbide formed as nanoparticles. The average size of the boron carbide nanoparticle was 2.9 nm. The boron carbide solid nanoparticle composition was formed in one step and exhibited great structural integrity, hardness, and toughness.

EXAMPLE 35

Formulation of Precursor Composition of Boron and TPEB Prepolymer Containing Chopped Fibers TPEB prepolymer from Example 24 (3.50 g; 7.32 mmol), and boron (10.9 g; 1008 mmol) were ball milled for 5 minutes resulting in a deep red-black fine powder. Chopped fibers (1.00 g, ¼" length) were added and the solid mixture was placed in 100 mL of acetone and stirred for 4 hr. The solvent was removed and the solid mixture was placed in a 2½" pellet die and pressed to 10,000 pounds for 1 minute.

EXAMPLE 36

Conversion of Precursor Composition of Boron and TPEB Prepolymer Containing Chopped Fibers to Thermoset The 2½" pellet from Example 35 was placed in a furnace, heated at 20° C./min under an argon atmosphere to 210° C., and held at this temperature for 10 hr (overnight) resulting in the formation of a tough shaped polymeric carbon fiber reinforced thermoset solid. The boron powder was homogeneous dispersed in the solid thermoset-carbon fiber composite.

EXAMPLE 37

Formation of Refractory Carbon Fiber Reinforced $B_4C$ Solid Ceramic in One Step by Heating at 2° C./Min to 1500° C. under an Argon Atmosphere The carbon fiber-containing shaped polymeric thermoset pellet (13.9 g) from Example 36 was placed in a 3" tube furnace, heated at 2° C./min under a flow (100 cc/min) of argon to 1500° C., and held at 1500° C. for 1 hr yielding a solid dense carbon fiber reinforced ceramic with weight retention of 85.0%. Upon cooling, the solid carbon fiber reinforced ceramic was removed from the furnace, characterized by XRD, and found to form nanoparticle sized $B_4C$ in the carbon-carbon fiber composite. The $B_4C$ carbon-carbon fiber solid composition exhibited great structural integrity with the inclusion of the fiber reinforcement.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. A method comprising:
   combining elemental boron and an organic compound having a char yield of at least 60% by weight to form a precursor mixture; and
   heating the precursor mixture in an inert atmosphere or vacuum at a temperature that causes polymerization of the organic compound to a thermoset to form a thermoset composition.

2. The method of claim 1, further comprising:
   placing the precursor mixture into a mold or shaped reactor.

3. The method of claim 1, further comprising:
   forming the precursor mixture into a shaped component.

4. The method of claim 1, wherein heating the precursor mixture is performed at 150-600° C.

5. The method of claim 1, further comprising:
   heating the thermoset composition in an inert atmosphere, argon, nitrogen, or vacuum at a temperature that causes formation of a ceramic comprising nanoparticles of boron carbide or boron nitride in a carbonaceous matrix.

6. The method of claim 5, wherein heating the thermoset composition is performed at 500-1900° C.

7. A method comprising:
   providing a precursor mixture of elemental boron and an organic compound;
   heating the precursor mixture in a vacuum or in an inert atmosphere at elevated pressure and at a temperature that causes polymerization of the organic compound to a thermoset to form a boron-thermoset composition; and
   heating the boron-thermoset composition in an inert atmosphere, argon, nitrogen, or vacuum at a temperature that causes formation of a ceramic comprising nanoparticles of boron carbide or boron nitride in a carbonaceous matrix;
   wherein the organic compound has a char yield of at least 60% by weight when heated at the elevated pressure.

* * * * *